(12) United States Patent
James et al.

(10) Patent No.: US 8,521,778 B2
(45) Date of Patent: Aug. 27, 2013

(54) SYSTEMS AND METHODS FOR PERMISSIONS-BASED PROFILE REPOSITORY SERVICE

(75) Inventors: Joshua G. James, Provo, UT (US); Brett M. Error, Orem, UT (US)

(73) Assignee: Adobe Systems Incorporated, San Jose, CA (US)

( * ) Notice: Subject to any disclaimer, the term of this patent is extended or adjusted under 35 U.S.C. 154(b) by 193 days.

(21) Appl. No.: 12/872,786

(22) Filed: Aug. 31, 2010

(65) Prior Publication Data

US 2011/0295899 A1 Dec. 1, 2011

Related U.S. Application Data

(60) Provisional application No. 61/349,725, filed on May 28, 2010.

(51) Int. Cl.
*G06F 17/30* (2006.01)

(52) U.S. Cl.
USPC .......................................................... 707/784

(58) Field of Classification Search
USPC .............................. 707/784, 999.001, 999.009
See application file for complete search history.

(56) References Cited

U.S. PATENT DOCUMENTS

| | | | |
|---|---|---|---|
| 6,182,068 B1 * | 1/2001 | Culliss | 707/721 |
| 2002/0091568 A1 * | 7/2002 | Kraft et al. | 705/14 |
| 2003/0097451 A1 * | 5/2003 | Bjorksten et al. | 709/228 |
| 2008/0162454 A1 * | 7/2008 | Lundell et al. | 707/5 |
| 2009/0083161 A1 | 3/2009 | Mital | |
| 2009/0083636 A1 | 3/2009 | Troiano et al. | |
| 2009/0222551 A1 | 9/2009 | Neely et al. | |
| 2009/0248511 A1 | 10/2009 | Mehta et al. | |
| 2009/0328169 A1 | 12/2009 | Hutchison et al. | |
| 2010/0017383 A1 | 1/2010 | Gaucas | |

OTHER PUBLICATIONS

"Unicode Consortium Hosts the Common Locale Data Repository (CLDR) Project," Apr. 21, 2004, 5 pages.

* cited by examiner

*Primary Examiner* — Thu-Nguyet Le
(74) *Attorney, Agent, or Firm* — Kilpatrick Townsend & Stockton LLP

(57) ABSTRACT

In some embodiments, provided is a method that includes storing, by a profile repository service, respective profile information for one or more users. The method includes receiving, by the profile repository service, permissions input from a particular one of the one or more users specifying content of the particular user's profile information accessible to content providers. Further, the method included receiving, by the profile repository service, a request from a content provider for profile information for the particular user, wherein the content provider is distinct from the profile repository service. The method also includes providing, by the profile repository service in response to the request, profile information for the particular user to the content provider, wherein the profile information is provided according to the permissions input from the particular user, and wherein the profile information is used to generate content delivered to the particular user remotely from the profile repository service.

21 Claims, 6 Drawing Sheets

SYSTEMS AND METHODS FOR PERMISSIONS-BASED PROFILE REPOSITORY SERVICE

This application claims priority to U.S. Provisional Patent Application No. 61/349,725 titled "Systems and Methods for Permissions-Based Profile Repository Service," inventors Joshua G. James and Brett M. Error, filed May 28, 2010, which is hereby incorporated by reference in its entirety.

BACKGROUND

Many different outlets are used to deliver marketing information, such as advertisements, to consumers. For example, television shows, movies, magazines, newspapers, web-page and e-mail often include some form of advertisements that are intended to be viewed or read by an audience that receives the content. Typically, the advertisements are provided in content in an attempt to reach a certain demographic that is expected to consume the content. Thus, common advertisements are delivered to a broad audience in hopes of reaching at least a few individuals that are interested in the content of the advertisement. For example, advertisements are often paired up with a complementary type of content in an attempt to target a certain demographic. In some instances, content providers go a step further, attempting to identify an individual user and tailor the advertisements to target that specific consumer. For example, targeting internet users based on their behavior, demographic, or preferences is growing in importance as advertisers attempt to improve efficiency and effectiveness of online advertising. Unfortunately, gathering the required marketing information about a user is often difficult and fraught with privacy concerns. In an attempt to provide advertisements that a consumer is more likely to respond to, advertisers are pressuring publishers and ad networks to learn as much as possible about individual consumers such that advertisements can be tailored to the individual. In the internet arena, this is commonly done by observing the internet content customers view/visit and trying to extrapolate information about the consumer such that advertisements provided to that consumer can be narrowly tailored to their demographic. Unfortunately, demographic information available to advertisers is limited. Even base attributes like gender are difficult to obtain. For example, although some techniques attempt to triangulate geographic location (address) of an internet user, and thereby extrapolate a socioeconomic status of the respective household, these methods are unreliable at best. In an effort to improve the acquisition of demographic information, some organizations track (or have attempted to track) customers across different websites.

Tracking customer behavior, however, can lead to serious customer objections with regard to their privacy. A user may be concerned about "big brother" observing and tracking their behavior, and may become even more concerned that they do not know what information has been collected. For example, internet users often express concern that as information accrues, individual are less anonymous and more easily identified personally. While many privacy pundits do not object to anonymously tracking individuals within the confines of a single website, they grow very concerned when that tracking extends to include several websites, or the Internet at large. As a result, content providers and advertisers are often limited to conservative approaches for identifying consumer demographics that provide limited data relating to their customers, and attempts to be more aggressive in obtaining the demographic information is receiving objections from consumers.

Accordingly, it is desirable to provide a technique for efficiently acquiring and providing user profile information for customers.

SUMMARY

Various embodiments of methods and apparatus for a permissions-based profile repository service are described. In some embodiments, provided is a method that includes storing, by a profile repository service, respective profile information for one or more users. The method includes receiving, by the profile repository service, permissions input from a particular one of the one or more users specifying content of the particular user's profile information accessible to content providers. Further, the method included receiving, by the profile repository service, a request from a content provider for profile information for the particular user, wherein the content provider is distinct from the profile repository service. The method also includes providing, by the profile repository service in response to the request, profile information for the particular user to the content provider, wherein the profile information is provided according to the permissions input from the particular user, and wherein the profile information is used to generate content delivered to the particular user remotely from the profile repository service.

In some embodiments, provided is a user profile repository system that includes a user profile repository. The user profile repository includes a profile repository for storing respective profile information for one or more, a user interface for receiving permissions input from a particular one of the one or more users specifying content of the particular user's profile information accessible to content providers, and a content provider interface. The content provider interface for receiving a request from a content provider for profile information for the particular user, and providing profile information for the particular user to the content provider. The content provider is distinct from the user profile repository. Further, the profile information is provided according to the permissions input from the particular user, and the profile information is used to generate content delivered to the particular user remotely from the user profile repository.

In some embodiments, provided is a non-transitory computer readable storage medium having program instructions stored thereon, wherein the program instructions are executable to cause a computer system to perform a method that includes storing, by a profile repository service, respective profile information for one or more users. The method includes receiving, by the profile repository service, permissions input from a particular one of the one or more users specifying content of the particular user's profile information accessible to content providers. Further, the method included receiving, by the profile repository service, a request from a content provider for profile information for the particular user, wherein the content provider is distinct from the profile repository service. The method also includes providing, by the profile repository service in response to the request, profile information for the particular user to the content provider, wherein the profile information is provided according to the permissions input from the particular user, and wherein the profile information is used to generate content delivered to the particular user remotely from the profile repository service.

Figure 1:
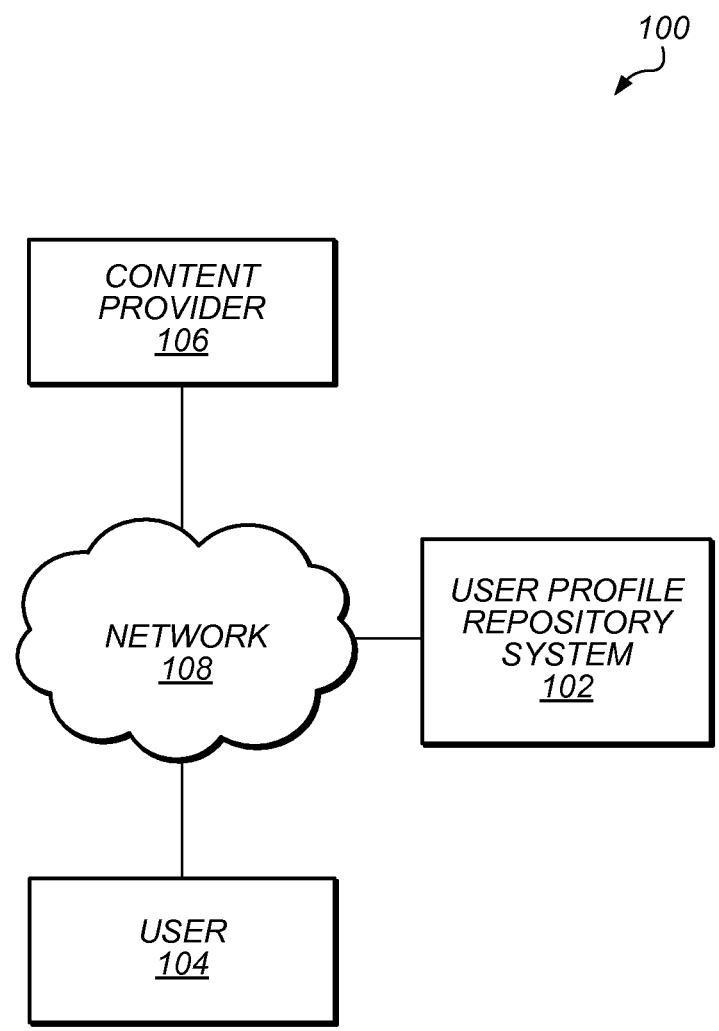
FIG. 1 as a block diagram that illustrates a marketing system in accordance with one or more embodiments of the present technique.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include", "including", and "includes" mean including, but not limited to. As used throughout this application, the singular forms "a", "an" and "the" include plural referents unless the content clearly indicates otherwise. Thus, for example, reference to "an element" includes a combination of two or more elements.

DETAILED DESCRIPTION OF EMBODIMENTS

As described in more detail below, provided in some embodiments are techniques for a user profile based marketing system and method. In some embodiments, a user profile repository system stores a plurality of user profiles that can be accessed by one or more content providers (e.g., advertisers) to acquire user profile information for a particular user. In certain embodiments, each of the user profiles corresponding to a particular user. In some embodiments, each user profile is created and controlled by their corresponding user. That is, a user may knowingly and voluntarily create and modify their user profile as well as control access to the user profile by other entities, such as content providers. In some embodiments, the user profile information stored in the user profile includes marketing information, such as demographic information (e.g., name, age, location) and/or marketing preferences (e.g., a preferred form of contact, such as e-mail). In certain embodiments, a content provider may access a user profile associated with a user, and may provide content (e.g., targeted advertising) to the user (e.g., a consumer/customer) in accordance with user profile information provided in the user profile. Thus, a content provider may be able to provide targeted advertisements based on presumably accurate information provided by the user as opposed to potentially inaccurate user profile information assimilated based on tracking or other techniques. In some embodiments, the user profile repository system and the user profiles stored therein are accessible by a plurality of different content providers. Thus, a single user profile may influence content provided to the user by a plurality of different content providers. For example, both an internet provider and a cable television provider may access the user profile, enabling targeting advertising to the user while surfing the web and watching television. Accordingly, a user may effectively control marketing content delivered to them by voluntarily/knowingly providing marketing information to a centralized location accessible by a plurality of content provider. Such techniques may help advertisers more effectively reach their target audience, may enable content provider/publishers to realize greater value for advertising, and may help users to receive advertisements that are interest to them, as opposed to random advertisements that are of no interest to the user.

Turning now to the figures, FIG. 1 as a block diagram that illustrates a marketing system 100 in accordance with one or more embodiments of the present technique. In the illustrated embodiment, system 100 includes a user profile repository system (service) 102, a user 104 and a content provider 106 communicatively coupled to one another via a network 108.

In some embodiments, each user profile is associated with a particular user and includes user profile information associated with the particular user. User profile information associated with each user profile may be provided by the respective user (e.g., user 104), and/or may be assimilated based on permissions granted by the respective user. In some embodiments, user profile information stored in association with each user profile is controlled by the respective user. For example, user 104 may knowingly and voluntarily add or remove user profile information, or even create or delete the entire user profile. Thus, user 104 may have complete control over user profile information associated with their user profile.

In some embodiments, user profile information includes marketing information, such as demographic information associated with the user. For example, user profile information may include a user's geographic location, gender, age, interest/hobbies, or dislikes. In some embodiments, user profile information includes other marketing information, such as marketing preferences. Marketing preferences may include an indication of user preferred forms of receiving marketing content (e.g., internet, e-mail, television, phone, mail, radio). In some embodiments, user profile information includes user defined permissions. Permissions may include permissions provided/approved by a user that specify what user profile information is to be shared with entities of system 100 and how. For example, permissions may specify which content providers have access to some or all of the user profile information. In some embodiments, the permission may also define how user profile information is handled by the system. For example, permission may enable or disable automatic assimilation of data relating to the user, as descried in more detail below. Such an embodiment may include limiting user profile information to only that information provided directly by the user. In some embodiments, permissions may specify that one content provider is granted access to a particular portion of user profile information, while another content provider is restricted from accessing the same portion of user profile information. Thus, user 104 may control in detail what user profile information is provided in their user profile and who/what has access to the user profile information.

Although certain embodiments include the user manually providing the user profile information, user profile information may be assimilated by one or more automated techniques approved by user 104. For example, a user may select (or at least not object to or inhibit) user profile repository system 102 automatically collecting data relating to the user. The assimilated data may be used in combination with or in place of the manually provided user profile information. In some embodiments, the techniques and systems for assimilating data must be approved by user 104 prior to being implemented to assimilate data pertaining to the respective user. For example, a user may select to allow or prevent assimilation of user profile information while editing their user profile. Requiring approval by the user may enable the user to retain control over information that is provided within their user profile.

Systems for automating the assimilation of data pertaining to one or more users may include publishing systems capable of identifying content interest areas and classified advertisement interest areas; retail systems capable of identifying favorite brands, spending habits, wish list (things considered, but not purchased); ticketing systems for identifying favorite bands and movies; and/or web-analytics systems for identifying time spent on-line, favorite sites, site visit frequency, key words searched (e.g., on web-sites or search portals). In some embodiments, these systems may be employed within user profile repository system 102 or may include other entities that provide such information to user profile repository system 102.

In some embodiments, user 104 may allow user profile repository system 102 to employ web-analytics to generate corresponding marketing information that is stored in association with their respective user profile. For example, a user may enable profile repository system 102 to track their visits to various URL's, use data mining and semantic association techniques to process/abstract information associated with the URL's, generate notions related to the process/abstracted information of the URL's, and map the notions into general areas of interest. As a result, the general areas of interest may be added to the user profile information, as opposed to a detailed listing of URL's visited by the user. A user may prefer providing access to the generalized information as opposed to providing a content provider with a detailed listing of URL's that may closely resemble tracking of the user's every move. In some embodiments, the resulting notions and mapping of notions may be provided with a confidence level that is indicative of the quality of the results. For example, a higher confidence level may be indicative of the results accurately reflecting the user's persona, desires, and preferences. Thus, user profile repository system 102 may provide for the translation of raw-detailed data information into higher-level generalizations that provide value to advertisers, while meeting the thresholds/bounds of information that the user is willing to share with other entities.

In some embodiments, user profile information may be automatically generated/revised/updated to reflect user preferences, favorite sites, or other information about the user that may be useful information to a content provider. In some embodiments, a user may provide blanket permission for the user repository system 102 to obtain and store particular user profile information, categories of user profile information, or all user profile information. For example, user 104 may select and apply a marketing preference within their user profile to provide blanket permission to allow updating of all types of user profile information upon receiving/generating such information. In some embodiments, a user may provide a real-time permission for the user repository system 102 to obtain and store particular user profile information, categories of user profile information, or all user profile information. For example, upon identifying potential information to add to the user's profile information, user repository system 102 may prompt user 104 for permission to add the information to the user's profile information, and may add the information to the profile upon user approval or may not add the information to the profile upon the user's disapproval. In some embodiments, a user may provide selective permission for the user repository system 102 to store particular user profile information. For example, upon identifying potential sets of information to add to the user's profile information, user profile repository system 102 may queue the sets of information for review by user 104, and prompt user 104 for permission (e.g., one-by-one) to add each potential set of information to the user profile information, and may add one or more sets of user profile information to the user profile upon approval, or may not add the information to the profile upon the user's disapproval.

Further, a user may have the ability to view, modify or delete their user profile at any time. In some embodiment, user 104 may be able to access and view their user profile information to see exactly what information is shared with other entities (e.g., content providers). In some embodiments, a user may have the ability to limit access to their profile by other entities of system 100, to block all access to their profile by other entities of system 100, or to completely remove their user profile from user profile repository system 102 and, thus, system 100. For example, user 104 may have the ability to set permissions or layers of access control which limit the user profile information that is made available to other entities of system 100. The access may be set on an entity by entity basis and/or for each portion of the user profile information separately. In some embodiments, removing/deleting a user profile may terminate the ability of content providers (e.g., advertisers) to access the respective user profile information. Such access and control may provide the user with a level of comfort knowing that they can limit access and even remove their user profile if desired. Thus, a user may have complete control over the existence of their user profile, what marketing information is provided in their respective user profile, and/or what marketing information is shared with other entities.

User profile information stored in user profiles may be made available to other entities of system 100 via an application programming interface (API). An API may include a variety of forms, including SOAP or HTTP redirection. Using an API may enable the user profile information to be made available to other entities in accordance with the marketing preferences provided by the user. In some embodiments, user profile information is provided in real-time to facilitate a content provider identifying appropriate content in view of the user profile information, and to dynamically provide/update the content for delivery to the user in real-time. For example, where a web-page is requested by a user, the web-page content provider may query the user profile repository system for information regarding user profile information associated with the requesting user, and may provide the web-page, including content (e.g., advertising) in accordance with the user profile information.

User profile repository system 102 may include a storage location, such as a database, for storing a plurality of user profiles associated with a plurality of respective users. In some embodiments, user repository 102 includes a centralized repository located on network 108. For example, repository 102 may include a non-distributed (e.g., centralized) database system that is used to store user profiles. In some embodiments, user repository 102 includes a distributed repository located on network 108. For example, repository 102 may include a distributed database that is under the control of a central database management system (DBMS) in which storage devices are not all attached to a common central processing unit (CPU). Such a distributed database may be distributed across multiple computers located in the same physical location, or may be dispersed over a network of interconnected computers. Thus, collections of user profiles (e.g., stored in a database of user profile repository system 102) can be distributed across multiple physical locations of network 108. For example, a distributed database of user profile repository system 102 may reside on network servers on the Internet, on corporate intranets or extranets, or on other networks.

Content provider 106 may include a source of content that is delivered to user 104. In some embodiments, content may include marketing content, such as advertisements that are provided in combination with other provided content. In some embodiments, marketing content may include advertisements or similar promotional material that is delivered in conjunction with traditional media content. For example, an internet content provider may provide a web-page comprising primary content (e.g., news information) and marketing content (e.g., an advertisement) embedded within or provided separate from the primary content. Similar marketing content may be provided in other forms of media. For example, a cable television provider may provide primary content in the form of television shows while also providing marketing content in the form of advertisements shown at commercial breaks, or even advertisements embedded in captions located on-screen during presentation of the television show.

Content may be provided in various forms of media. For example, marketing content may include internet content, (e.g., a web page) provided by an internet content provider, video/audio content provided by a television content provider, audio content provided by a radio content provider, written/article content provided via a magazine/newspaper content provider, mailers provided by a postal/mailer content provider, or the like. It will be appreciated that the listing of content providers is exemplary, as the techniques described herein may be used with any type of content and entity interested in deriving user profile information relating to a user. For example, an entity may be interested in accessing user profile information even though they do not have a desire to contact the user directly. Content provider 106 may include one or both of a provider that actually delivers content to the user and an entity that collects information, such as an advertising agency, that may direct how and what content is provided to user 104. In some embodiment, content provider 106 may include any entity that desires to retrieve user profile information. In some embodiments, content provider 106 may not actually provide content to the user.

User 104 may include an entity (e.g., a person, group of persons, business, etc.) that requests and/or receives content from content provider 106. As discussed above, the content received may depend on the type of content. Where content includes internet content, for example, user 104 may include a person at a computer terminal accessing web-pages via an internet web-browser application, and content provider 106 may include a web-site provider that provides the content to user 104 in the form of a web-page. Where the content includes television content, user 104 may include a person watching television programming and content provider 106 may include a television (e.g., digital TV, cable TV, satellite TV) provider. Where the content includes a radio content, user 104 may include a person listening to the radio and content provider 106 may include a radio (e.g., FM/AM radio, satellite-radio or high-definition-radio) provider. Where the content includes magazine/newspaper content, user 104 may include a magazine or newspaper subscriber and content provider 106 may include the magazine/newspaper publisher. Wherein the content includes postal/mailer content, user 104 may include a mail (e.g., postal mail) recipient, and content provider 106 may include a distributor of advertisement flyers/mailers or the like.

Network 108 may include any channel for providing effective communication between each entities of system 100. In some embodiments, network 108 includes an electronic communication network, such as the internet, a local area network (LAN), a cellular communications network, or the like. For example, network 108 may include an internet network used to facilitate communication between each of the entities (e.g., user 104 profile repository system 102, user 104 and content provider 106) of system 100. An electronic communications network may enable the exchange of information between user 104 and user profile repository system 102, as well as between content provider 106 and user profile repository system 102 to facilitate the immediate exchange of user profile information. Thus, user 104 may instantly update their user profile information and content provider 106 may instantly access user profile information. Such instantaneous access may be especially beneficial where a content provider is attempting to provide targeted marketing to a user in real-time. For example, upon receiving a user request to view a web-page, an internet content provider may submit a request to the user profile repository system to access the user's associated user profile information, the associated user profile information may be provided to the content provider, and the content provider may provide content to the user in accordance with the user profile information. For example, the user may be provided a web-page having advertisements that are targeted to the user based on the user profile information. Thus, a content provider may provide dynamic targeting marketing that reflects the present user profile information associated with the user.

In some embodiments, content may be delivered via network 108. For example, where content includes internet content, network 108 may include the internet or a similar electronic communication network, as described above. In some embodiments, content may be delivered via a communication channel, other than network 108, which facilitates the delivery of content between content provider 106 and user 104. For example, For example, where content is not deliverable via the internet or a similar electronics communication network, the content may be provided via another channel, such as a cable/satellite television network, a radio/satellite-radio network, a mailing/shipping network, or the like. Where content provider 106 includes a mailer provider, mail provider may deliver content to user 104 via a postal mail service, although the mail provider and user 104 may be communicatively coupled to user profile repository system 102 via network 108. Thus, the postal service may include a channel for the exchange of content that is separate from network 108. As a further example, where content provider 106 includes a cable television provider, user 104 and content provider 106 may be coupled to user profile repository system 102 via an internet connection to facilitate the exchange of electronic data (e.g., user profile information), while content provider 106 is communicatively coupled to user 104 via a cable/satellite cable network that enables the communication of content (e.g., television programming and television advertisements) from content provider 106 to user 104 (e.g., via a television viewed by user 104). As will be appreciated, cable/satellite network may include or at least partially rely on internet based communications. Thus, the channel for the exchange of content may be facilitated by or work in combination with, network 108.

Figure 2:
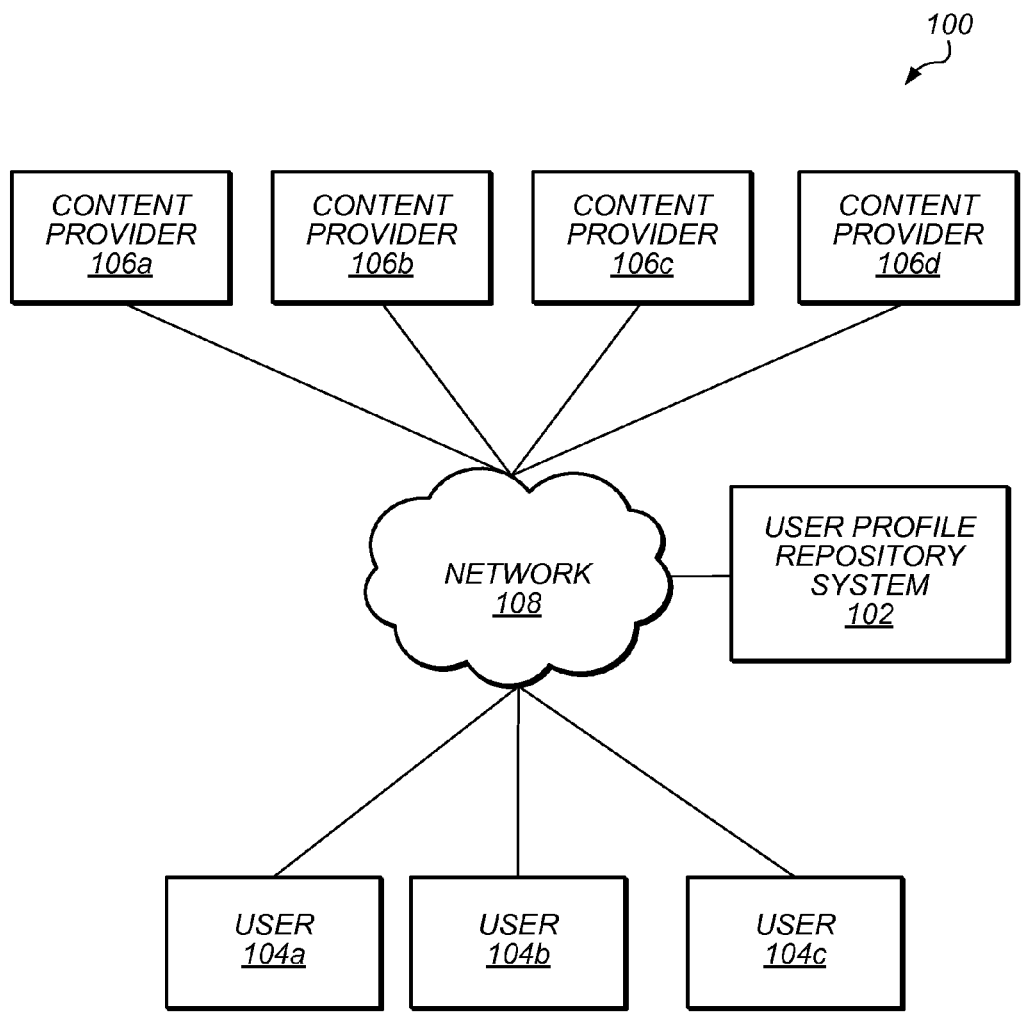
FIG. 2 is a diagram that illustrates the marketing system including a plurality of content providers and a plurality of users communicatively coupled to user profile repository system in accordance with one or more embodiments of the present technique.

FIG. 2 is a diagram that illustrates system 100 including a plurality of content providers 106a-106d and a plurality of users 104a-104c communicatively coupled to user profile repository system 102 in accordance with one or more embodiments of the present technique. Such an embodiment may enable a plurality of users and/or content provider to access a user profile repository to provide and/or access marketing information associated with a plurality of user profiles stored at the user profile repository. Thus, system 100 may enable a user to voluntarily/knowingly provide their marketing information in a single user profile that is accessible by a plurality of content providers, and may enable multiple content providers to access the voluntarily/knowingly provided user profile information for a plurality of users form a single location (e.g., user profile repository system 102). Any number of providers and user may be coupled to user profile repository system 102. For example, users and content providers may be added to and dropped from system 100 as demand changes. Accordingly, a user may effectively control marketing content delivered to them from a plurality of content channels by voluntarily/knowingly providing marketing information to a centralized location accessible by a plurality of content provider.

Each of content providers 106a-106d may be communicatively coupled to user profile repository system 102 such that each of content providers 106a-106d may access user profiles (and associated user profile information) for each of the respective users 104a-104b stored in user profile repository system 102. Content providers 106a-106d may include any combination of the same or different types of content providers. For example, in an internet based system 100, content providers 106a-106d may all include internet content providers, such as different web-sites providers, that serve web-pages to users 104. In some embodiments, providers 106a-106d may include any combination of different types of content providers. For example, content providers 106a and 106b may include internet content providers, content provider 106c may include a television content provider, and content provider 106d may include a radio content provider.

Users 104a-104c may include entities (e.g., one or more persons or business) that consume the content provided by one or more of content providers 106a-106d. For example, in the internet based system 100 (in which content providers 106a-106d all include internet content providers), users 104 may each include persons that access provided web-sites and web-pages via an internet web-browser application running on a computer device, such as a personal computer, cellular-phone, personal digital assistant, (PDA), or the like.

In an embodiment in which providers 106a-106d include a combination of different types of content providers, users 104 may consume different types of content provided any of the content providers 106a-106d. For example, where content providers 106a and 106b include internet content providers, content provider 106c includes a television content provider, and content provider 106d includes a radio content provider, user 104a may consume internet content provided by providers 106a and 106b via a web-page browser at work and at home, television content while watching their television at home, and radio content while listening to the radio on their way to and from work. Thus, user 104a may effectively control marketing content delivered to them via the various content channels by voluntarily/knowingly providing user profile information stored in a single user profile that is accessible by the plurality of content providers 106a-106b.

Where a user does not have a corresponding user profile, or has otherwise not provided an indication to a content provider that they have a user profiles stored in user profile repository system 102, content provider may provide standard content that is not based on an associated user profile. For example, where user 104b does not have a user profile content providers 106a-106d may provide content to user 104b that includes advertisements that are not specifically tailored to user 104b or that is tailored to user 104b based on other user profile information gathered independent of a user profile stored in user profile repository system 102 (e.g., via traditional web-analytics). Thus, user 104b may receive traditional advertisements that are not based on marketing information that is voluntarily/knowingly provided for inclusion in a user controlled user profile. Note, however, that even where user 104b does not provide an indication to a content provider that they have a user profiles stored in user profile repository system 102, they may provide such an indication to another of the content providers. For example, user 104b may log-in or other wise provide an indication to content provider 106a of their desire to receive content based on their user profile, while not logging-in or other wise provide an indication to content provider 106a of their desire to receive content based on their user profile. As noted above, even when logged into or otherwise providing an indication of a user profile to a content provider, user 104 may limit user profile information that is made available to the respective content provider via setting of their user profile.

In some embodiments, content providers 106a-106d may tailor/modify their content (e.g., marketing content) delivered to one or more users based on the user profile information provided in a user profile corresponding to the respective user. For example, where content provider 106a includes an internet content provider, content provider 106a may deliver the same or substantially same primary web-page content to each user 104a, 104b and 104c requesting content, but may customize at least a portion of web-page advertisements based on user profile information provided in each user's respective user profile. Where a user profile for user 104a has user profile information indicative of an interest in sports, content provider 106a may provide a web-page that includes the primary content and an advertisement for a sports drink. Where a user profile for user 104a has user profile information indicative of an interest in travel, content provider 106a may provide a web-page that includes the primary content and an advertisement for a vacation getaway. Where a user profile for user 104b does not have user profile information specify any particular interest, or that blocks access by content provider 106a to the marketing information, content provider 106a may provide a web-page that includes the primary content and a common advertisement not specifically tailored to the interest of user 104c. Similar techniques may be employed by providers in other types of media. For example, a cable television provider may alter commercials that are shown based on a user profile associated with a person expected to be watching the television. Thus, content provider 106a may effectively target marketing content delivered to a user based on user profile information that is voluntarily/knowingly provide by a user in a user profile stored in a user profile repository accessible by a plurality of content providers and entities of system 100.

Figure 3A:
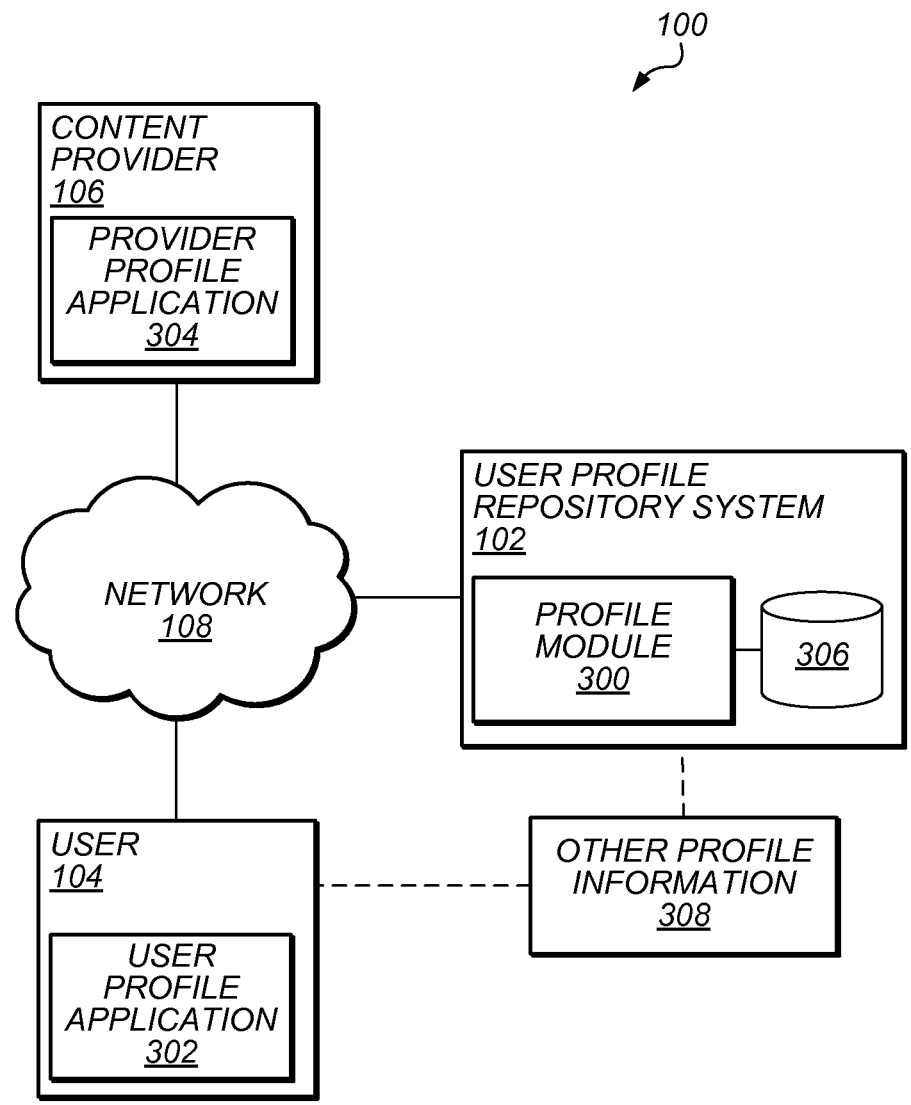
FIGS. 3A and 3B are diagrams that illustrate entities of the marketing system including applications/modules in accordance with one or more embodiments of the present technique.

In some embodiments, communication between entities of system 100 may be effectuated via one or more applications provided at one or more of the entities. FIG. 3A is a diagram that illustrates entities of system 100 including applications/modules in accordance with one or more embodiments of the present technique. In the illustrated embodiment, a profile module 300 is provided at user profile repository system 102, a user profile application 302 is provided at user 104, and a provider profile application 304 is provided at content provider 106. In some embodiments, user profile repository system 102 includes a remote system/service that is accessible by a plurality of users 104a-104c and/or a plurality of content providers via network 108. In some embodiments, such a remote system 102 may enable users and content providers to access system 102 directly, without establishing a connection via another entity of system 100, such as via a user 104.

In some embodiments, profile module 300 provides a communication interface that enables the exchange of user profile information between user profile repository system 102 and other entities/applications of system 100 via network 108 or other communications channels. For example, profile module 300 may receive user profile information provided by a user at application 302 and store some or all of the provided user profile information to a data store (e.g., database) 306. In some embodiments, the user profile information is stored in a user profile corresponding with the particular user. As a further example profile module 300 may provide user profile information to provider profile application 304 at content provider 106. For example, profile module 300 may receive a request for user profile information from provider profile application 304 and may, in response to the request, retrieve corresponding user marketing information from a user profile from data store 306, and provide the information to provider profile application 304 and content provider 106.

In some embodiments, user profile application 302 may be used to identify user 104 and/or enable the exchange of data between user 104 and user profile repository system 102. For example, user profile application 302 may include a cookie stored at a user computer device that is used to identify user 104 when they communicate with profile module 300 (e.g., log-into or visit a web-site for profile module 300). The cookie may be provided by profile module 300 at a prior exchange between profile module 300 and user 104. In some embodiments, user profile application may include a browser plug-in installed on a computer device of user 104. A browser plug-in may enable user 104 to communicate directly with profile module 300. In some embodiments, a browser plug-in may reduce issues associated with a user device or application rejecting or otherwise deleting cookies, rendering them ineffective for identifying user 104. A browser plug-in may enable a user to readily access other entities of system 100 (e.g., user profile repository system 102 via profile module 300) and/or provide additional services (e.g., internet services) to user 104. For example, user profile application may include a browser plug-in that continuously displays options to the user regarding their current marketing information and available selections for changing their marketing information.

In some embodiments, provider profile application 304 may be used to facilitate the exchange of data between content provider 106 and user profile repository system 102. For example, upon receiving request for content from user 104 and/or at some point prior to providing content to user 104, content provider profile application 304 may query profile module 300 for user profile information associated with user 104. Upon receipt of the query, profile module 300 may access a user profile corresponding to user 104 that is stored in data store 306 to retrieve the requested user profile information. The retrieved user profile information may, then, be forwarded to provider profile application 304 in accordance to marketing preferences selected by user 104. Such an application may be used to verify the identity of the entity, thereby inhibiting unauthorized access to the user profile and associated user profile information.

In some embodiments, user profile repository system 102 may enable associating other forms of information with a user profile. For example, a user may enable user profile repository system 102 to connect their profile with other profile information 308 already available about them. In some embodiments, other profile information 308 may include a profile for the user associated with a social networking site, common shopping portals, or the like. For example, where user 104 has provided information about themselves at a social networking site, user 104 may indicate their desire for the user profile repository system 102 to retrieve and/or monitor that information. In response, profile module 300 may connect with other profile information 308 provided at the site and import relative user profile information for inclusion the corresponding user profile. In some embodiments, profile module 300 may monitor other profile information 308 and dynamically update the user profile as the information changes. Thus, user may indirectly create or update their user profile via updating other profile information that is connected to their user profile. A user may also provide an indication of what other profile information is to be connected to their profile. For example, user 104 may indicate a desire to only share their personal demographic location, while blocking information relating to their employment, etc.

In some embodiments, user profile repository 102 may be configured by user 104 to provide information to other profile information locations. For example, user 104 may enable user profile repository system 102 to provide information (e.g., their interest) from their user profile to a social networking site. Profile module 300 may assess/process their user profile to determine that recent interest include sailing, boating, fishing, and may forward this information to the social networking site. Thus, user profile information may be used to augment the user's online social networking persona.

In some embodiments, content providers may be charged a fee to access the user profile information. Users may be allowed to join for free, may be paid an incentive, or may be charged a nominal fee to have their user profiles stored in user profile repository 102. Such a minimal barrier to entry or even incentive may encourage a large number of users to provide user profiles. In some embodiments, content providers may provide incentives for users that partake in providing user profile information to user profile repository system. Content provider 106 may provide greater access to content or higher quality content for users 104 merely having user profiles, ore user profiles that include and/or share certain types or amounts of user profile information. For example, an internet content provider may enable full access to all or some of their web-site where a user has provided and/or made available at least their name, age, and location within their user profile, and may inhibit full access to certain portions of their web-site where a user has not provided and/or made available at least their name, age, and location within their user profile. In some embodiments, a content provider may require at least certain profile information to even access their web-site. Such an access limitation may encourage users to provide information within their user profiles. Moreover, the content providers may be able to more readily identify their users, thereby generating a premium price for their advertisement. The premium price for advertising may be justified by the content provider's ability to provide accurate demographic information of their users, enabling advertisers to provide targeted advertisements that are of interest to the users.

In some embodiments, user profile information stored in a user profile may be used for auto-population of fields in forms filled out by the user. For example, when an identified user is filling out a field of an internet web-page and the user has set their user profile to allow the use of their user profile information for auto-populating, the field may be auto-populated using user profile information stored in user profile repository 102. In some embodiments, the user profile information used for auto-populating fields may not be shared with other entities. For example, the user may set a marketing preference that the particular information not be shared with an entity or group of entities, although the user has set a marketing preference that the particular information can be used for auto-population of data.

Figure 3B:
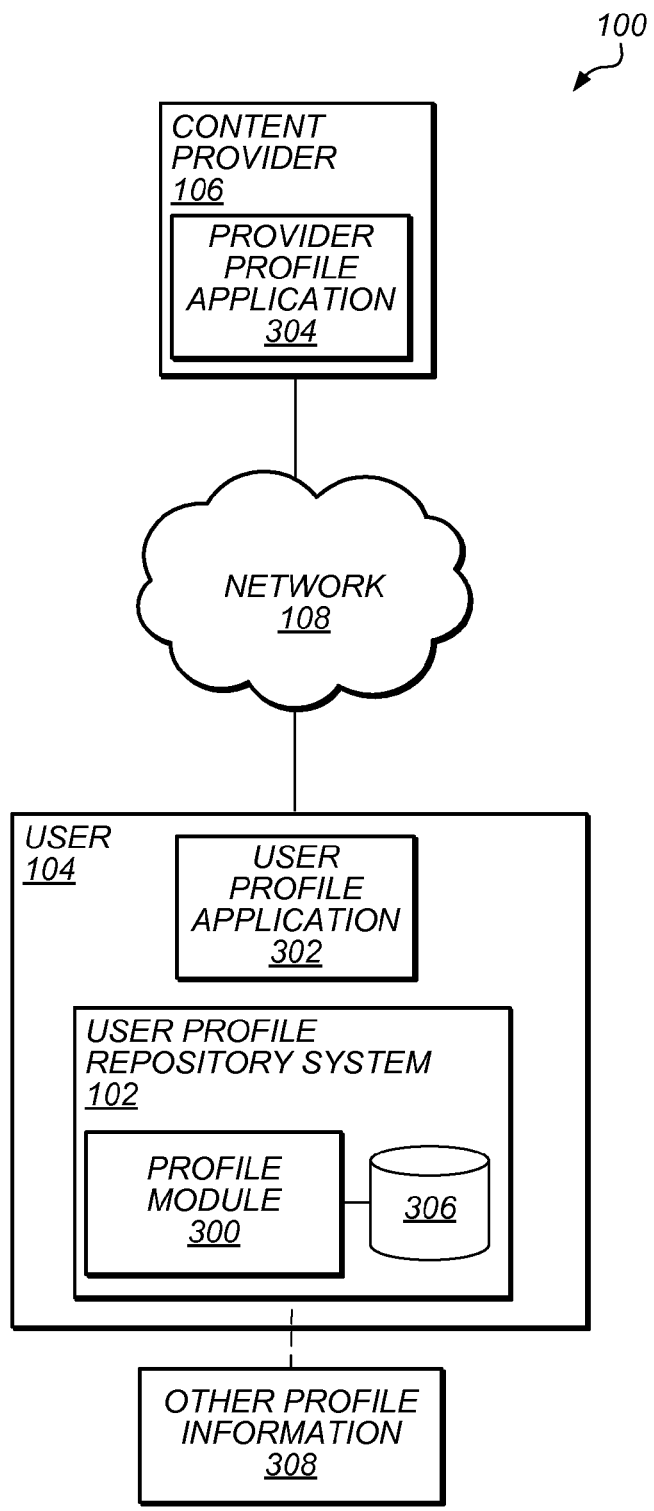

In some embodiments, user profile system 102 may be provided locally at an entity of system 100. For example, user profile system 102 may be provided locally at content provider 106 and/or user 104. FIG. 3B is a diagram that illustrates entities of system 100 including applications/modules in accordance with one or more embodiments of the present technique. In the illustrated embodiment, profile repository system 102 is provided locally at user 104. Other embodiments may include similar system employed at one or more other entities of system 100, such as a plurality of users and/or content providers. In some embodiments, user profile repository system 102 may include components similar to that described above with respect to remote user profile repository system of FIG. 3A. In such an embodiment, user profile repository system 102 may be employed locally via a user computer system (e.g., of user 104) as opposed to a computer system of an entity that is remotely located on network 108 relative to user 104 (e.g., remote user profile repository system 102 of FIG. 3A). In some embodiments, user profile application 302 may provide an interface between the user profile system 102 and a content provider 106 or other entity of system 104. In some embodiments, such a locally employed system 102 may enable users and/or content providers to access system 102 directly, without establishing a connection via another entity of system 100, such as via remote user profile repository system 102 of FIG. 3A. In some embodiments, a local user profile repository system may be used in place of or in combination with a remote user profile repository system. For example, as depicted in FIG. 3B, local user profile repository system 102 may include a standalone application that executes independent of other user profile repository systems. In some embodiments, system 100 may include a local user profile repository system and a remote user profile repository system may be provided in combination (e.g., on the same network 108). In some embodiments, the local and remote user profile repository systems may have at least some dependence on one another and/or interaction with one another. For example, information entered and/or stored locally at user profile repository system 102 at user 104 may be periodically sent to and stored at remote user profile repository, such as that of user profile repository system 102 of FIG. 3A (e.g., to backup the information entered and/or stored locally at user 104). Thus, the information may be more readily available to other entities on network 108 via the remote and/or local user profile repository and/or the remote user profile repository may provide for back-up of the information in the instance it is lost or corrupted at the remote and/or local user profile repository. In some embodiments, user profile repository system 102 may employ cookies or similar techniques for authenticating users, for providing user preferences, or similar information about user 104. For example, cookies may be stored in datastore 306 or a similar memory location and may be provided to content provider 106 upon initiation of a session between content provider 106 and user 104 (e.g., in response to a request from content provider 106 and/or with a request from user 104 to content provider 106. In some embodiments, datastore 306 may include a local memory device, such as a hard-drive, static random access memory (SRAM), synchronous dynamic RAM (SDRAM), nonvolatile/Flash-type memory, or any other type of memory. In some embodiments, a user may enable user a local profile repository system 102 to connect their profile with other profile information 308 already available about them, as discussed above.

Figure 4:
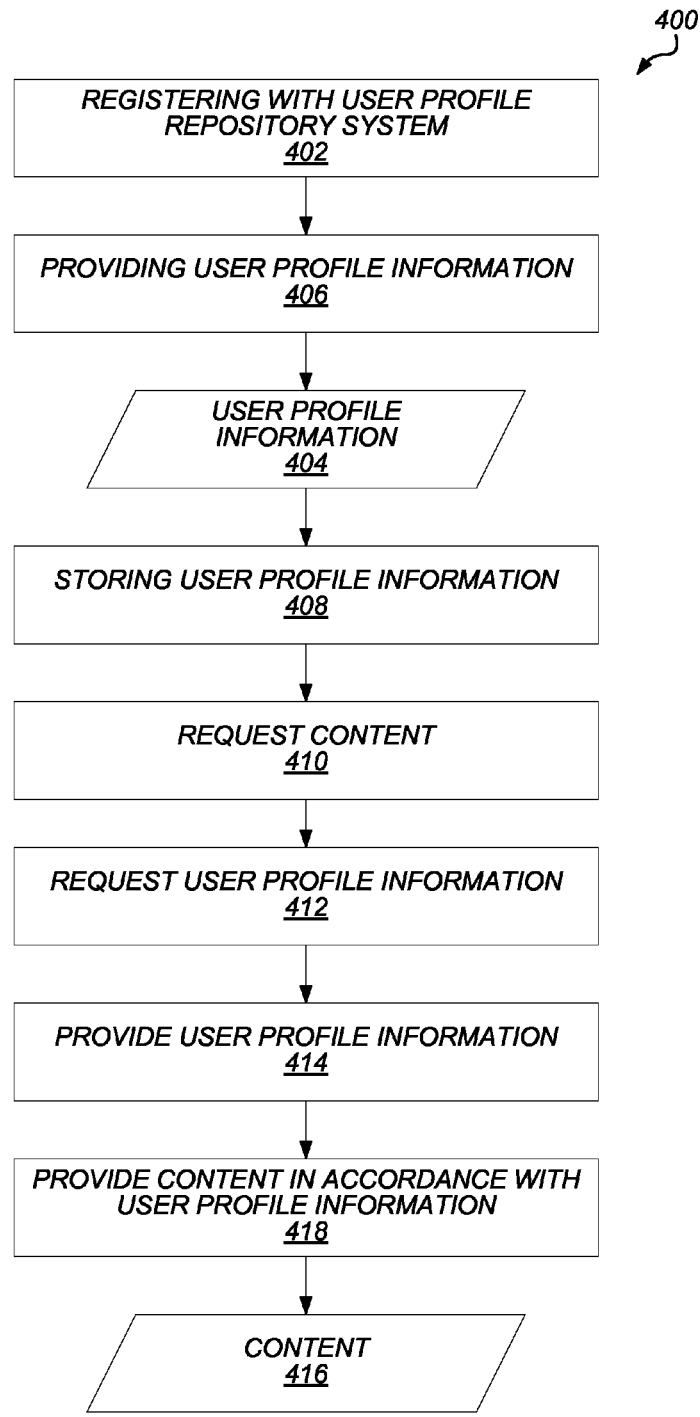
FIG. 4 is a flowchart that illustrates a method of providing content to a user in accordance with one or more embodiments of the present technique.

FIG. 4 illustrates a method 400 of providing content to a user in accordance with one or more embodiments of the present technique. Method 400 may be implemented using system 100 and or one or more techniques described herein with regard to system 100. Method 400 generally includes a registering with a profile repository system, a providing user profile information (e.g., to the profile repository system), storing the user profile information, a request for content, a request for user profile information, providing user profile information, and providing the content in accordance with the user profile information.

In the illustrated embodiment, method 400 includes a registering with a user profile repository, as depicted at block 402. In some embodiments, registering with profile repository may include user 104 initially registering with profile repository system 102 to generate a user profile having user profile information. For example, user 104 may visit a web-site of the user profile repository system 102, and create a user profile account (e.g., a user name and password) that is to be associated with their user profile. In some embodiments, a user may be provided an opportunity to download an application (e.g., user profile application 302) that can be used to access their user profile account. For example, upon generating an account, a user may be provided the option of downloading a plug-in that can be used to access their user account. Such an application may enable a user to access and modify their user account without having to revisit the web-site of the user profile repository system 102. In some embodiments, a user registering with user profile repository system 102 may include a user (e.g. user 104) that is already registered with profile repository system 102 simply signing/logging into their user account. For example a user may visit the web-site of the user profile repository system 102 and enter their authentication credentials (e.g., username and password) or may simply launch an application (e.g., a plug-in or web-browser having a cookie stored therewith) that enables user profile repository system 102 to authenticate user 104. Thus, a user may be provided access to their respective user profile, including their user profile information, upon registering.

In the illustrated embodiment, method 400 includes providing user profile information 404, as depicted at block 406. In some embodiments, providing user profile information includes user 104 providing user profile information to user repository system 102. The provided user profile information 404 may be stored in association with the user's corresponding user profile. In some embodiments, user profile information 404 may include marketing information/preferences associated with the particular user. The user may add as little or as much information as they desire with the explicit understanding that the information provided in the user profile may be shared with other entities, such as content providers (e.g., internet advertisers) or other locations for profile information, such as a social networking site. In some embodiments, providing user profile information may include employing other techniques for assimilating user profile information, such as those described above. For example, providing user profile information may include enabling user profile repository system 102 to share user profile information with other entities (e.g., other profile information 308) and/or process user profile information to generate user profile information associated with the user.

In the illustrated embodiment, method 400 includes storing user profile information, as depicted at block 408. Storing user profile information may include storing user profile information in association with a user profile. For example, profile module 300 may commit the user profile information to data store 306 in association with the corresponding user profile.

In the illustrated embodiment, method 400 includes requesting content, as depicted at block 410. In some embodiments, requesting content includes user 104 indicating a desire to receive content from content provider 106. Where content provider 106 includes an internet web-page content provider, for example, requesting content may include user 104, providing to content provider 106 via network 108, a request to view a web-page. The request may be initiated by user 104 entering a URL in their browser or selecting a URL link in another web-page document.

In the illustrated embodiment, method 400 includes requesting user profile information, as depicted at block 412. Requesting user profile information may include an entity indicating a desire to retrieve user profile information from user profile repository system 102. For example, where content provider 106 includes a web-page provider, upon receiving, from user 104, a request for the web-page content the web-page, content provider 106 may identify user 104 and send a corresponding request to user profile repository system 102. The request may include a request for some or all of the user profile information (e.g., user hobbies) associated with the particular user. In some embodiments, the request may be generated at provider profile application 304 and may be transmitted to profile module 300 via network 108.

In the illustrated embodiment, method 400 includes providing user profile information, as depicted at block 414. Providing user profile information may include user profile repository system 102 processing a request for user profile information, assessing whether or not to provide the requested profile information, and providing an appropriate response to the request that includes or does not include the requested profile information. For example, wherein content provider 106 has provide a request user profile information (e.g., user hobbies) associated with user 104, user repository system 102 may determine whether or not content provider 106 has sufficient access to the requested user profile information. In some embodiments, access may be determined based on marketing information/preferences set by a user while providing user profile information at block 406. If it is determined that content provider 106 does have sufficient access to the requested user profile information, the requested user profile information (e.g., hobbies for user 104) may be forwarded to content provider 106. If it is determined that content provider 106 does not have sufficient access to the requested user profile information, the requested user profile information (e.g., hobbies for user 104) may not be forwarded to content provider 106. In some instances, content provider 106 may have access to some but not all of the requested user profile information, and, thus, user profile repository system 102 may forward only the user profile information content provider 106 has access to, while not forwarding the user profile information content provider does not have access to. In some embodiments, processing is provided at profile module 300, the user profile information is retrieved from data store 306, and the accessible user profile information is communicated from profile module 300 to provider profile application 304 via network 108.

In the illustrated embodiment, method 400 includes providing content 416 in accordance with user profile information, as depicted at block 418. Providing content in accordance with user profile information may include content provider 106 providing content to user 104 in accordance with user profile information that was received from user profile repository system 102 in response to the request for user profile information. For example, where content provider 106 includes the internet web-page content provider, and the provided user profile information indicates a hobby of sports, the internet web-page provider may generate and return to user 104 a web-page that includes primary content along with marketing content directed towards sports (e.g., an advertisement for a sports drink). In some embodiments, such as those where content provider 106 did not have access to the requested user profile information, and/or no user profile information was provided to content provider 106, content provider 106 may provide content that is not based on the user profile information. For example, content provider 106 may provide a generic advertisement directed to the general public, or may use other forms of web-analytics to assimilate information about the user (e.g., attempt to triangulate the user's location based on their IP address) to provide content that is tailored for user 104.

It will be appreciated that method 400 is an exemplary embodiment of a method employed in accordance with techniques described herein. Method 400 may be may be modified to facilitate variations of its implementations and uses. For example, although some embodiments have been descried with respect to internet web-page content and an internet/web-page content provider, similar techniques may be employed for other content and content providers, such as video/audio content provided by a television content provider, audio content provided via a radio content provider, written content provided via a magazine/newspaper content provider, mailers provided by a postal/mailer content provider, or the like. Method 400 may be implemented in software, hardware, or a combination thereof. The order of method 400 may be changed, and various elements may be added, reordered, combined, omitted, modified, etc.

Figure 5:
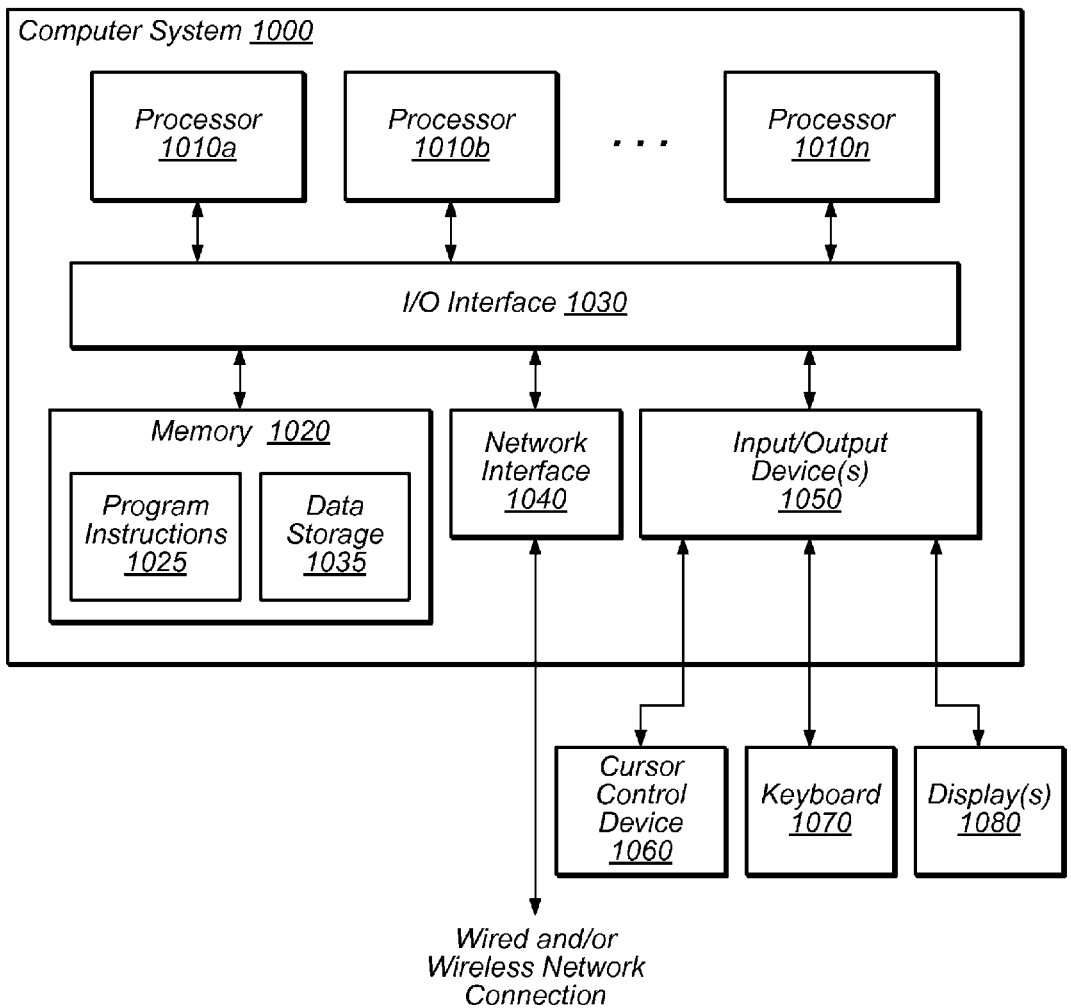
FIG. 5 is a block diagram that illustrates an exemplary computer system in accordance with one or more embodiments of the present technique.

Various components of embodiments of the user profile based marketing systems and methods, as described herein, may be executed on one or more computer systems, which may interact with various other devices. For example, user profile module 300 user profile application 302 and/or provider profile application 304 may be executed on one or more computer systems. One such computer system is illustrated by FIG. 5. In the illustrated embodiment, computer system 1000 includes one or more processors 1010 coupled to a system memory 1020 via an input/output (I/O) interface 1030. Computer system 1000 further includes a network interface 1040 coupled to I/O interface 1030, and one or more input/output devices 1050, such as cursor control device 1060, keyboard 1070, audio device 1090, and display(s) 1080. In some embodiments, it is contemplated that embodiments may be implemented using a single instance of computer system 1000, while in other embodiments multiple such systems, or multiple nodes making up computer system 1000, may be configured to host different portions or instances of embodiments. For example, in one embodiment some elements may be implemented via one or more nodes of computer system 1000 that are distinct from those nodes implementing other elements.

In various embodiments, computer system 1000 may be a uniprocessor system including one processor 1010, or a multiprocessor system including several processors 1010 (e.g., two, four, eight, or another suitable number). Processors 1010 may be any suitable processor capable of executing instructions. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA.

In some embodiments, at least one processor 1010 may be a graphics processing unit. A graphics processing unit or GPU may be considered a dedicated graphics-rendering device for a personal computer, workstation, game console or other computer system. Modern GPUs may be very efficient at manipulating and displaying computer graphics and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, the methods disclosed herein for layout-preserved text generation may be implemented by program instructions configured for execution on one of, or parallel execution on two or more of, such GPUs. The GPU(s) may implement one or more application programmer interfaces (APIs) that permit programmers to invoke the functionality of the GPU(s). Suitable GPUs may be commercially available from vendors such as NVIDIA Corporation, ATI Technologies, and others.

System memory 1020 may be configured to store program instructions and/or data accessible by processor 1010. In various embodiments, system memory 1020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above for a layout-preserved text generation method, are shown stored within system memory 1020 as program instructions 1025 and data storage 1035, respectively. In other embodiments, program instructions and/or data may be received, sent or stored upon different types of computer-accessible media or on similar media separate from system memory 1020 or computer system 1000. Generally speaking, a computer-accessible medium may include storage media or memory media such as magnetic or optical media, e.g., disk or CD/DVD-ROM coupled to computer system 1000 via I/O interface 1030. Program instructions and data stored via a computer-accessible medium may be transmitted by transmission media or signals such as electrical, electromagnetic, or digital signals, which may be conveyed via a communication medium such as a network and/or a wireless link, such as may be implemented via network interface 1040.

In one embodiment, I/O interface 1030 may be configured to coordinate I/O traffic between processor 1010, system memory 1020, and any peripheral devices in the device, including network interface 1040 or other peripheral interfaces, such as input/output devices 1050. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components. In addition, in some embodiments some or all of the functionality of I/O interface 1030, such as an interface to system memory 1020, may be incorporated directly into processor 1010.

Network interface 1040 may be configured to allow data to be exchanged between computer system 1000 and other devices attached to a network, such as other computer systems, or between nodes of computer system 1000. In various embodiments, network interface 1040 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1050 may, in some embodiments, include one or more display terminals, keyboards, keypads, touchpads, scanning devices, voice or optical recognition devices, or any other devices suitable for entering or retrieving data by one or more computer system 1000. Multiple input/output devices 1050 may be present in computer system 1000 or may be distributed on various nodes of computer system 1000. In some embodiments, similar input/output devices may be separate from computer system 1000 and may interact with one or more nodes of computer system 1000 through a wired or wireless connection, such as over network interface 1040.

As shown in FIG. 5, memory 1020 may include program instructions 1025, configured to implement embodiments of a layout-preserved text generation method as described herein, and data storage 1035, comprising various data accessible by program instructions 1025. In one embodiment, program instructions 1025 may include software elements of a layout-preserved text generation method illustrated in the above Figures. Data storage 1035 may include data that may be used in embodiments, for example input PDF documents or output layout-preserved text documents. In other embodiments, other or different software elements and/or data may be included.

Those skilled in the art will appreciate that computer system 1000 is merely illustrative and is not intended to limit the scope of a layout-preserved text generation method as described herein. In particular, the computer system and devices may include any combination of hardware or software that can perform the indicated functions, including computers, network devices, internet appliances, PDAs, wireless phones, pagers, etc. Computer system 1000 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via intercomputer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1000 may be transmitted to computer system 1000 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present invention may be practiced with other computer system configurations. In some embodiments, portions of the techniques described herein (e.g., preprocessing of script and metadata may be hosted in a cloud computing infrastructure.

Various embodiments may further include receiving, sending or storing instructions and/or data implemented in accordance with the foregoing description upon a computer-accessible medium. Generally speaking, a computer-accessible storage medium may include a non-transitory storage media such as magnetic or optical media, (e.g., disk or DVD/CD-ROM), volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

Various modifications and changes may be to the above technique made as would be obvious to a person skilled in the art having the benefit of this disclosure. For example, although several embodiments are discussed with regard to internet/web-page content, the techniques described herein may be applied to assess and determine data relating other types of content (e.g., television, radio, magazine/newspaper, etc.). It is intended that the invention embrace all such modifications and changes and, accordingly, the above description to be regarded in an illustrative rather than a restrictive sense. While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include", "including", and "includes" mean including, but not limited to. As used throughout this application, the singular forms "a", "an" and "the" include plural referents unless the content clearly indicates otherwise. Thus, for example, reference to "an element" includes a combination of two or more elements. Unless specifically stated otherwise, as apparent from the discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

What is claimed is:

1. A method, comprising:

receiving, by a profile repository service executed by a processor, profile information for at least one profile account, wherein the profile information is received via at least one session with the profile repository service authenticated via the at least one profile account;

determining, by the profile repository service, that the at least one profile account has authorized collecting additional profile information in addition to and different from the profile information received via the at least one session;

augmenting, by the profile repository service, the profile information with additional profile information for the at least one profile account from at least one source other than the at least one profile account, wherein augmenting the profile information is performed based on determining that the at least one profile account has authorized collecting the additional profile information;

receiving, by the profile repository service, a request from a content provider for at least some of the profile information or the additional profile information, wherein the content provider is distinct from the profile repository service; and responsive to receiving the request, providing, by the profile repository service, the at least some of the profile information or the additional profile information to the content provider, wherein the at least some profile information is provided based on determining that the at least one profile account has authorized sharing the at least some of the profile information or the additional profile information.

2. The method of claim 1, wherein receiving the profile information from the at least one profile account comprises:

establishing, by the profile repository service, the at least one session with the at least one profile account by authenticating at least one credential associated with the at least one profile account; and identifying, by the profile repository service, that input received during the at least one session directs the profile repository service to store the profile information.

3. The method of claim 2, wherein augmenting the profile information with the additional profile information comprises:

establishing, by the profile repository service, an additional session with the at least one profile account by authenticating the at least one credential associated with the at least one profile account;

identifying, by the profile repository service, that additional input received during the additional session directs the profile repository service to perform an action other than storing the profile information; and generating, by the profile repository service, the additional profile information based on the action directed by the additional input.

4. The method of claim 3, wherein determining that the at least one profile account has authorized collecting the additional profile information comprises:

providing, by the profile repository service, a prompt interface via the additional session to authorize generating the additional profile information based on the action directed by the additional input; and generating the additional profile information in response to receiving input to the prompt interface indicative of an authorization to collect the additional profile information.

5. The method of claim 1, wherein the profile repository service comprises at least one of:
- a local profile repository service executed at a computer system at which an application accessible via the at least one profile account is executed;
- an internet web-page provider; or
- a remote profile repository service providing respective profile information for each of a plurality of profile accounts in addition to the at least one profile account.

6. The method of claim 1, further comprising:
- receiving, by the profile repository service, an additional request from an additional content provider for at least some of the profile information or the additional profile information, wherein the additional content provider is distinct from the content provider and the profile repository service; and
- responsive to receiving the additional request, providing, by the profile repository service, the at least some of the profile information or the additional profile information to the additional content provider, wherein the at least some profile information is provided based on determining that the at least one profile account has authorized sharing the at least some of the profile information or the additional profile information.

7. The method of claim 1, wherein the profile repository service resides on a network and is accessible by a plurality of different content providers via the network.

8. The method of claim 1, wherein augmenting the profile information with the additional profile information comprises:
- tracking a plurality of websites accessed via the at least one profile account;
- identifying a common interest associated with at least some of the plurality of websites; and
- augmenting the profile information with the additional profile information, the additional profile information comprising the common interest.

9. The method of claim 8, wherein augmenting the profile information with the additional profile information further comprises:
- determining that the at least one profile account has authorized augmenting the profile information with a list of the plurality of websites; and
- augmenting the profile information with the additional profile information, the additional profile information further comprising the list of the plurality of websites.

10. A non-transitory computer-readable medium embodying program code executable by a computer system to provide a profile repository service, the program code comprising:
- program code for receiving profile information for at least one profile account, wherein the profile information is received via at least one session with the profile repository service authenticated via the at least one profile account;
- program code for determining that the at least one profile account has authorized collecting additional profile information in addition to and different from the profile information received via the at least one session;
- program code for augmenting the profile information with additional profile information for the at least one profile account from at least one source other than the at least one profile account, wherein augmenting the profile information is performed based on determining that the at least one profile account has authorized collecting the additional profile information;
- program code for receiving a request from a content provider for at least some of the profile information or the additional profile information, wherein the content provider is distinct from the profile repository service; and
- program code for, responsive to receiving the request, providing the at least some of the profile information or the additional profile information to the content provider, wherein the at least some profile information is provided based on determining that the at least one profile account has authorized sharing the at least some of the profile information or the additional profile information.

11. The non-transitory computer-readable medium of claim 10, wherein the program code for receiving the profile information from the at least one profile account comprises:
- program code for establishing the at least one session with the at least one profile account by authenticating at least one credential associated with the at least one profile account; and
- program code for identifying that input received during the at least one session directs the profile repository service to store the profile information.

12. The non-transitory computer-readable medium of claim 11, wherein the program code for augmenting the profile information with the additional profile information comprises:
- program code for establishing an additional session with the at least one profile account by authenticating the at least one credential associated with the at least one profile account;
- program code for identifying that additional input received during the additional session directs the profile repository service to perform an action other than storing the profile information; and
- program code for generating the additional profile information based on the action directed by the additional input.

13. The non-transitory computer-readable medium of claim 12, wherein determining that the at least one profile account has authorized collecting the additional profile information comprises:
- program code for providing a prompt interface via the additional session to authorize generating the additional profile information based on the action directed by the additional input; and
- program code for generating the additional profile information in response to receiving input to the prompt interface indicative of an authorization to collect the additional profile information.

14. The non-transitory computer-readable medium of claim 10, further comprising:
- program code for receiving an additional request from an additional content provider for at least some of the profile information or the additional profile information, wherein the additional content provider is distinct from the content provider and the profile repository service; and
- program code for, responsive to receiving the additional request, providing the at least some of the profile information or the additional profile information to the additional content provider, wherein the at least some profile information is provided based on determining that the at least one profile account has authorized sharing the at least some of the profile information or the additional profile information.

15. The non-transitory computer-readable medium of claim 10, wherein the program code for augmenting the profile information with the additional profile information comprises:
  program code for tracking a plurality of websites accessed via the at least one profile account;
  program code for identifying a common interest associated with at least some of the plurality of websites; and
  program code for augmenting the profile information with the additional profile information, the additional profile information comprising the common interest.

16. The non-transitory computer-readable medium of claim 15, wherein augmenting the profile information with the additional profile information further comprises:
  program code for determining that the at least one profile account has authorized augmenting the profile information with a list of the plurality of websites; and
  program code for augmenting the profile information with the additional profile information, the additional profile information further comprising the list of the plurality of websites.

17. A computer system comprising:
  a processor;
  a non-transitory computer-readable medium in communication with the processor;
  wherein the processor is configured to execute program code embodied in the non-transitory computer-readable medium to provide a profile repository service by performing operations comprising:
    receiving profile information for at least one profile account, wherein the profile information is received via at least one session with the profile repository service authenticated via the at least one profile account,
    determining that the at least one profile account has authorized collecting additional profile information in addition to and different from the profile information received via the at least one session,
    augmenting the profile information with additional profile information for the at least one profile account from at least one source other than the at least one profile account, wherein augmenting the profile information is performed based on determining that the at least one profile account has authorized collecting the additional profile information,
    receiving a request from a content provider for at least some of the profile information or the additional profile information, wherein the content provider is distinct from the profile repository service, and
    responsive to receiving the request, providing the at least some of the profile information or the additional profile information to the content provider, wherein the at least some profile information is provided based on determining that the at least one profile account has authorized sharing the at least some of the profile information or the additional profile information.

18. The system of claim 17, wherein the processor is configured for receiving the profile information from the at least one profile account by performing operations comprising:
  establishing the at least one session with the at least one profile account by authenticating at least one credential associated with the at least one profile account; and
  identifying that input received during the at least one session directs the profile repository service to store the profile information.

19. The system of claim 18, wherein the processor is configured for augmenting the profile information with the additional profile information by performing operations comprising:
  establishing an additional session with the at least one profile account by authenticating the at least one credential associated with the at least one profile account;
  identifying that additional input received during the additional session directs the profile repository service to perform an action other than storing the profile information; and
  generating the additional profile information based on the action directed by the additional input.

20. The system of claim 17, wherein the processor is configured for augmenting the profile information with the additional profile information by performing operations comprising:
  tracking a plurality of websites accessed via the at least one profile account;
  identifying a common interest associated with at least some of the plurality of websites; and
  augmenting the profile information with the additional profile information, the additional profile information comprising the common interest.

21. The system of claim 20, wherein the processor is further configured for augmenting the profile information with the additional profile information by performing additional operations comprising:
  determining that the at least one profile account has authorized augmenting the profile information with a list of the plurality of websites; and
  augmenting the profile information with the additional profile information, the additional profile information further comprising the list of the plurality of websites.

* * * * *

UNITED STATES PATENT AND TRADEMARK OFFICE
CERTIFICATE OF CORRECTION

| | | |
|---|---|---|
| PATENT NO. | : 8,521,778 B2 | Page 1 of 1 |
| APPLICATION NO. | : 12/872786 | |
| DATED | : August 27, 2013 | |
| INVENTOR(S) | : James et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 195 days.

Signed and Sealed this
Twenty-first Day of January, 2014

Michelle K. Lee
*Deputy Director of the United States Patent and Trademark Office*